R. SHALER.
Turn Table for Baker's Ovens.
No. 58,489. Patented Oct. 2, 1866.
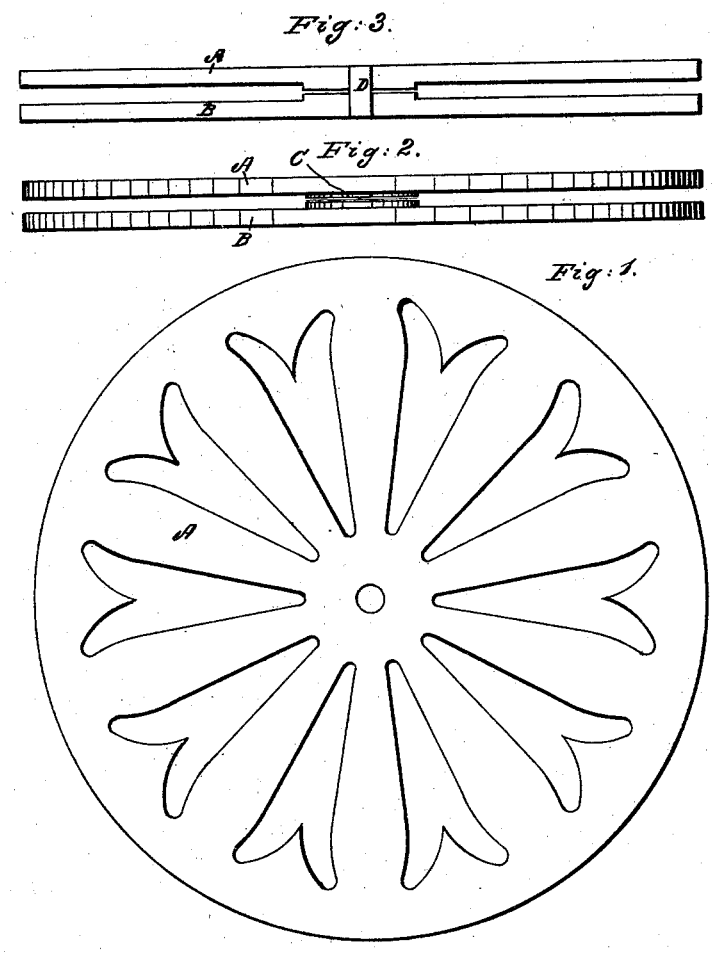

UNITED STATES PATENT OFFICE.

REUBEN SHALER, OF MADISON, CONNECTICUT.

TURN-TABLE FOR BAKERS' OVENS.

Specification forming part of Letters Patent No. 58,489, dated October 2, 1866.

*To all whom it may concern:*

Be it known that I, REUBEN SHALER, of Madison, in the county of New Haven and State of Connecticut, have invented a new Turn-Table for Bakers' Ovens; and I do hereby declare the following, when taken in connection with the accompanying drawings and the letters of reference marked thereon, to be a full, clear, and exact description of the same, and which said drawings constitute part of this specification, and represent, in—

Figure 1, a top view; Fig. 2, a side view; and in Fig. 3 a vertical central section.

In most ovens used for culinary purposes it is necessary, in order to evenly bake the articles placed therein, to turn them around from time to time during the process of baking. The inconvenience with which this is accomplished is too well known to require description.

To simplify this operation, or rather to make it more convenient, is the object of my invention, which consists in forming a turn-table which may be readily placed in any part of the oven, upon which the article is set, and when, at times, it is required to turn the article for the purpose of more evenly baking, a simple touch, pressing in either direction, will turn the article as may be desired.

To enable others skilled in the art to construct and use my invention, I will proceed to describe the same as illustrated in the accompanying drawings.

A B are two disks, of any convenient size and form, and ornamented according to the taste of the manufacturer, so as to be open as much as possible, as seen in Fig. 1. Between the two disks is placed a collar, C, or may be a slight projection, as seen in Fig. 3, which forms a bearing between the two disks, upon which the upper one may be turned, the two secured together by a rivet, D, or its equivalent.

Thus constructed, my turn-table may be placed in the oven, either side up, and the article to be baked set thereon; and when, at times, it is desired to turn the article for any purpose, it requires but to turn the table more or less, as desired.

Having thus fully described my invention, what I claim as new and useful, and desire to secure by Letters Patent, is—

The herein-described turn-table, as a new article of manufacture.

REUBEN SHALER.

Witnesses:
M. A. HINE,
JOHN H. SHUMWAY.